July 27, 1926.

F. W. REYNOLDS

OPTICAL SYSTEM

Filed Dec. 1, 1925

1,593,639

Inventor:
Frederick W. Reynolds
by  Atty.

Patented July 27, 1926.

1,593,639

UNITED STATES PATENT OFFICE.

FREDERICK W. REYNOLDS, OF GRANTWOOD, NEW JERSEY, ASSIGNOR TO AMERICAN TELEPHONE AND TELEGRAPH COMPANY, A CORPORATION OF NEW YORK.

OPTICAL SYSTEM.

Application filed December 1, 1925. Serial No. 72,585.

This invention relates to optical systems, and more particularly to optical systems adapted for use in the transmission of views by electricity.

The object of the invention is an improved method of scanning on object, screen, receiving surface or the like.

A feature of the invention relates to an optical system in which an object may be explored by the use of mirrors arranged to vibrate about parallel axes.

Another feature relates to a system in which a right-angle prism is employed to rotate the image of an object through a right angle to enable an area to be scanned by two mirrors each having a single vibratory motion and the axes of vibration being parallel.

Other features and advantages of the invention will appear from the following detailed description and the appended claims.

Figure 1:
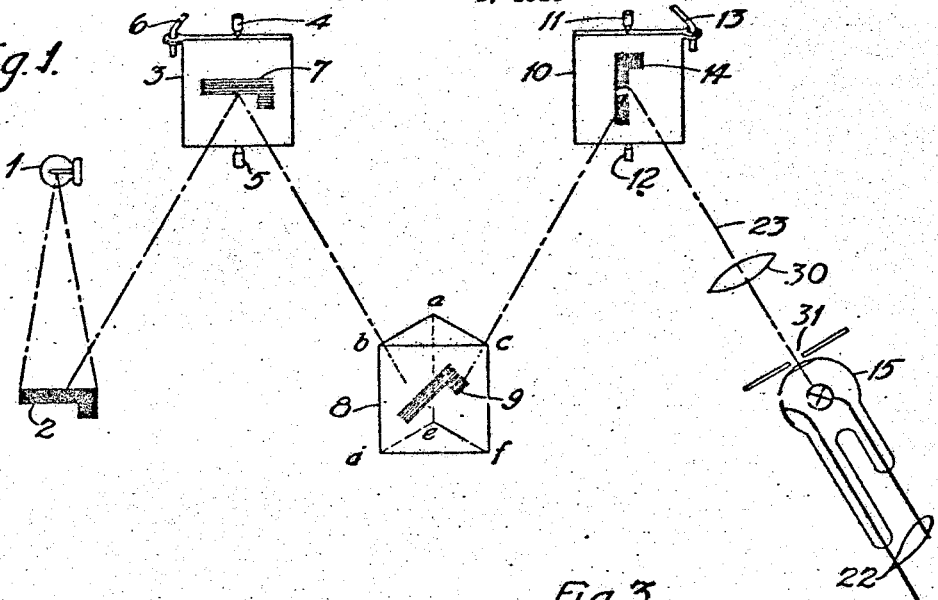

In the drawing. Figure 1 illustrates an optical system embodying the features of this invention.

Figure 2:
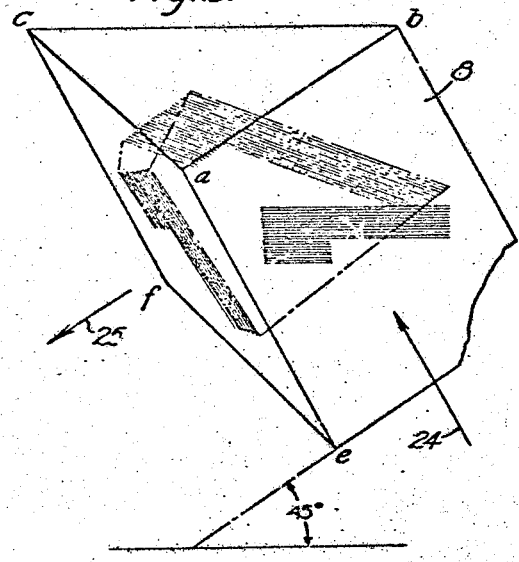

Fig. 2 is an enlarged view of the prism used in the system.

Figure 3:
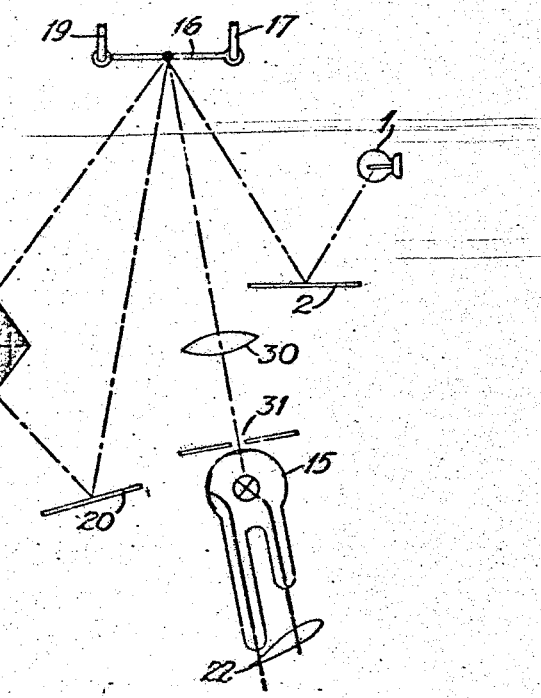

Fig. 3 discloses a modification of the system.

Figure 4:
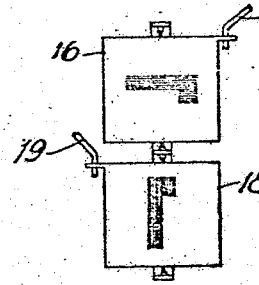

Fig. 4 is a detailed showing of the mirrors employed in the system of Fig. 3.

In order to give an explicit description of the invention, it has been shown as embodied in an optical system such as found at the sending station of a picture transmission or television system. The system consists primarily of a source of light 1, a pair of reflecting devices such as mirrors 3 and 10, a prism 8, a lens 30 and a photoelectric cell 15. The lens 30 is provided between the mirrors and the cell 15 to form the image of the object in the plane of an aperture 31 in front of the cell.

The mirror 3 is mounted on an axis determined by the pivots 4 and 5 for a simple single vibratory motion about said axis. To impart this movement to the mirror, there is provided a driving member 6 which may be attached to any suitable mechanism such as the armature of an electromagnetic device actuated by alternating or other variable current. The second mirror 10 is mounted upon an axis determined by the pivots 11 and 12 which is parallel to the axis of the first mirror and is therefore vibrated in the same direction as the mirror 3. A driving member 13 is also provided for oscillating the mirror 10 about its axis.

A prism 8 is situated at some suitable point which is optically intermediate of the mirrors 3 and 10. The prism 8 is preferably an isosceles right angle prism and may be of quartz to secure greater sensitivity of the photoelectric cell. It is properly located in the optical system by first placing it in such a position that a right triangle section *abc* is perpendicular to the plane containing the axes of mirrors 3 and 10, and then rotating the prism about the hypotenuse *bc* until the plane containing the right angle section *abc* intersects the plane containing the axes of the mirrors at an angle of forty-five degrees. The tilted position of the prism 8 is better seen from Fig. 2.

In order to secure greater sensitivity, the mirrors may be of the first surface type.

If it is desired to transmit an image of an object 2 to a distance, the object is introduced into the optical system at such a position that its reflected light passes to the mirror 3. It will also be apparent that if the object 2 is in the form of a transparent film, the same result may be had by causing light from the source 1 to shine through the object 2 onto the surface of the mirror 3. The light thus reaching the mirror 3 is reflected thereby and enters the side *abde* of prism 8. The light passes to the side *bcfd* where it is reflected and then emerges from the side *acfe* and passes to the surface of the second mirror 10. The mirror 10 reflects the light received to the lens 30 which forms an image of the original object in the plane of the aperture 31 and into the cell 15.

The operation of the system shown in Fig. 1 will now be briefly described. Assume that the object 2 is placed in the position shown relative to the mirror 3; in other words, the object 2 is horizontally arranged with respect to its greater dimension. By vibrating the mirror 3 about its axis 4—5, a beam of light traveling the path shown by the broken lines will be caused to vibrate back and forth in a horizontal plane. The figure 7, which may represent an image of the object 2, as seen by an observer in the mirror 3, has the same vertical and horizontal disposition as the object itself. In effect, the mirror 3 causes light from the object reflected from the mirror to vibrate back and forth horizontally across the surface of the prism 8.

The light representing the object 2 is reflected by the mirror 3 and enters the side *abde* of the prism 8. This light in passing to the side *bdfc* of the prism is refracted, due to the angle at which the prism is inclined. The figure 9 represents the direction of vibration of the beam of light in the prism 8, rotation through an angle of forty-five degrees from the horizontal having taken place. Light from the surface *bdfc* is reflected and emerges from the side *acfe* of the prism. During this passage to the emerging side, it is again refracted so that the axis of the figure 9 is rotated through another angle of forty-five degrees in the same direction. Thus, the figure 14 shown on the mirror 10 represents an image of the object 2 which appears to an observer to have been rotated through a complete angle of ninety degrees from the position of the object 2 due to the refraction of the prism 8. Since the mirror 10 is oscillated in the same direction as the mirror 3, the effect is to cause the beams of light to scan the object 2 in a direction at right angles to the direction of scanning by the mirror 3. The mirror 10 reflects the light to the lens 30 which forms an image in the plate of aperture 31. The light which passes through enters the cell and causes, in the well known manner, the liberation of photoelectrons to establish in the circuit 22 a current which is directly proportional to the tone values of the elemental areas of the object 2 being scanned. The elementary areas of the image are passed in succession in front of the aperture 31 due to the method of scanning described above.

From the foregoing description, it will be seen that if a single beam of light is considered as reaching the photoelectric cell over the path 23, this beam is moved across the object 2 in a horizontal direction back and forth by the oscillation of the mirror 3. The same beam, due to its passage through the prism 8, is moved up and down in a vertical direction over the surface of the object 2 by the mirror 10. In other words, the image formed in the plane of the aperture 31 is thus caused to move vertically back and forth by means of mirror 3 and prism 8 and horizontally by means of mirror 10, so that all elements of said image pass over the aperture. If the mirrors 3 and 10 are driven at suitable relative speeds of oscillation, the effect is the scanning of the entire area of the object 2.

Fig. 2 shows more clearly the manner in which the light from the object 2 is rotated by refraction through an angle of ninety degrees. The arrow 24 indicates the direction of entrance of the light, and the arrow 25 the direction of emergence.

Fig. 3 illustrates a modification in which the mirrors are located adjacent to each other. The mirror 16 is arranged for oscillation by a driving member 17, and the mirror 18 for oscillation by the driving member 19. The beam of light passing from the source 1 is reflected from the surface of the object 2 to the surface of mirror 16. It is then reflected to the entrant side of the prism 8, from which it emerges and passes to the surface of a stationary mirror 20. The mirror 20 reflects the beam to the surface of a second vibrating mirror 18 adjacent to mirror 16 as shown in Fig. 4, from which it is reflected to lens 30 which forms an image of the object in the plane of the aperture 31 near the photo-electric cell 15.

While the invention has been shown in specific embodiments, it will be obvious that various arrangements may be employed as desired. For example, the prism may be rotated through some angle other than forty-five degrees to determine the amount of rotation of the image desired. Also, the mirrors may be polyhedral and arranged for continuous rotation. The relative speeds of the two mirrors may be regulated to give such patterns of scanning as may be desirable.

While the optical system has been shown as applied to the transmission station of a picture transmission or television system, it may also be adapted to use at the receiving station.

A picture transmission system of the general type to which this invention is applicable is illustrated in the application of Horton, Ives and Long, Serial No. 714,466, filed May 19, 1924.

What is claimed is:

1. The combination in an optical system of an object to be scanned, means including a source of light for producing an image of said object, a plurality of mirrors arranged for vibration on parallel axes, and means cooperating with said mirrors for moving said image in a plurality of directions.

2. The combination in an optical system of an object to be scanned, means including a source of light for producing an image of said object, a plurality of mirrors each arranged for a single vibratory motion about parallel axes, a member having an aperture, and means cooperating with said mirrors for presenting successive elemental portions of the image to said aperture.

3. The combination in an optical system of an object to be scanned, means including a source of light for forming an image of said object, a plurality of mirrors arranged with their surfaces parallel for vibrating about parallel axes, and means coacting with said mirrors for causing said image to move in a plurality of directions.

4. The combinations in an optical system of an object to be explored, means comprising a source of light for forming an image of said object, a plurality of mirrors arranged for vibration on parallel axes, and means cooperating with said mirrors whereby said mirrors respectively impart to the image components of motion in different directions.

5. In an optical system, an object, a source of light for illuminating said object, a vibratory mirror for vibrating a beam of light from said source in a given plane, means for rotating the plane of vibration through an angle whereby the vibration of the beam is in a plane at an angle to the first mentioned plane, and a second mirror vibrating in the same direction as the first mirror for giving said beam a second vibratory movement in the first mentioned plane.

6. In an optical system, an object, means including a source of light for forming an image of said object, a plurality of mirrors arranged for vibration on parallel axes, and a prism cooperating with said mirrors for causing said image to move in a plurality of directions.

7. In an optical system, an object to be explored, means including a source of light for forming an image of the object, two mirrors for reflecting said light arranged for vibration on parallel axes, and a right-angled prism having the plane of a right triangular section inclined at an angle to the plane of said mirrors for rotating said image of the object through an angle proportional to the angle of inclination.

8. In an optical system, an object to be explored, a source of light for illuminating the object, two mirrors arranged for vibration on parallel axes, and a right-angled prism having the plane of a right triangular section inclined at an angle of forty-five degrees to the plane of said mirrors for rotating an image of the object through an angle of ninety degrees to the angle of inclination.

9. The combination in an optical system of an object to be scanned, means including a source of light for forming an image of said object, a pair of vibratory mirrors having parallel axes, means for driving said mirrors at different speeds, and means cooperating with the mirrors for causing the image to move in two different directions.

In testimony whereof, I have signed my name to this specification this 30th day of November, 1925.

FREDERICK W. REYNOLDS.